United States Patent [19]

Ryokai et al.

[11] Patent Number: 4,886,088
[45] Date of Patent: Dec. 12, 1989

[54] METHOD AND APPARATUS FOR MEASURING WATER CONTENT

[75] Inventors: Kimitoshi Ryokai; Naruki Wakabayashi, both of Tokyo, Japan

[73] Assignee: Shimizu Construction Co., Ltd., Tokyo, Japan

[21] Appl. No.: 152,350

[22] Filed: Feb. 4, 1988

[30] Foreign Application Priority Data

Feb. 6, 1987 [JP] Japan .................................. 62-25870
Feb. 6, 1987 [JP] Japan .................................. 62-25871
Feb. 6, 1987 [JP] Japan .................................. 62-25872

[51] Int. Cl.$^4$ ............................................. B05B 9/06
[52] U.S. Cl. .................................. 137/78.3; 239/63; 374/147
[58] Field of Search ................... 239/63; 137/78.3; 374/147, 148

[56] References Cited

U.S. PATENT DOCUMENTS

| | | | |
|---|---|---|---|
| 4,059,982 | 11/1977 | Bowman | 374/44 |
| 4,261,382 | 4/1981 | Bridges | 374/147 |
| 4,630,036 | 12/1986 | Ford | 374/148 |
| 4,693,419 | 9/1987 | Weintraub et al. | 137/78.3 |

*Primary Examiner*—A. Michael Chambers
*Attorney, Agent, or Firm*—Oblon, Spivak, McClelland, Maier & Neustadt

[57] ABSTRACT

According to a method and an apparatus for measuring a water content, a thermal conductivity of a measurement target is measured, and a water content of the measurement target is calculated from the thermal conductivity in accordance with prepared data which represents correlation between a thermal conductivity and a water content of the measurement target. A water content management system controls the water content in accordance with the actual water content. If the water content is excessive, it is informed by an alarm system.

10 Claims, 6 Drawing Sheets

METHOD AND APPARATUS FOR MEASURING WATER CONTENT

BACKGROUND OF THE INVENTION

The present invention relates to a method and apparatus for measuring a water content by using a thermal conductivity and, more particularly, to a method and apparatus for obtaining a water content in a soil from the thermal conductivity of the soil.

Conventionally, when an amount of water (water content) of soil is to be measured, sampling is performed every time measurement is required, and the water content of the sample is measured in a laboratory. If the water content must be managed, for example, the valve of a sprinkler is controlled by the operator in accordance with the water content obtained by the measurement. In management of the water content in banking, an RI (Radioactive Isotope) is detected from the surface of the ground. The count of the RI counter that changes in accordance with the water content of the soil is used to measure the water content in the banking.

However, when a water content is to be measured by sampling, sampling must be performed every time the water content is to be measured. This requires a cumbersome and time-consuming operation. When a water content is to be measured using an RI counter, the RI counter is as very expensive as several million yen, and water content of only the surface layer of the earth of about several tens cm of depth can be measured.

A theory of heat flow conduction is developed from a Fourier's basic heat conduction equation. In this equation, the nature of heat conduction is included in the thermal conductivity for the sake of simplicity. This theory is correct when a correct thermal conductivity is used. Therefore, efforts have been concentrated on measurement and study of thermal conductivity.

Conventional methods for measuring a thermal conductivity are classified into steady-state and unsteady-state methods. According to the steady-state method, high precision is obtained when measurement is performed at room temperature. However, it is difficult to maintain a steady state at high temperatures, and it requires a long period of time for measurement. In contrast to this, according to the unsteady method, measurement can be performed within a shorter period of time, the size of a sample can be small, and measurement can be performed at both high and low temperatures. Therefore, recently, when thermal characteristics of a solid, such as ground, rock, and concrete, are to be measured, the unsteady-state method is adopted.

Examples of the unsteady-state method of this type include a thermal conductivity measuring method called a thermal probe method. According to the thermal probe method, a needle-like thermal probe having a pair of a temperature sensor and a heater is inserted into a sample. The heater in the probe is caused to generate heat and the temperature change and time are measured. The thermal conductivity is obtained based on the temperature change.

When the heater in the thermal probe is heated to increase the temperature, heat conduction occurs in the sample. In this case, when the thermal conductivity of the sample is high, the heat generated by the heater is easily dissipated. However, when the thermal conductivity of the sample is low, the heat generated by the heater cannot be easily dissipated. As a result, the temperature of the heater is abruptly increased with a steep ramp. The time and the temperature change in this case exhibit a certain correlation with each other when the time base is expressed as a logarithm. As a result, the thermal conductivity can be calculated from the gradient of the linear portion of the graph.

However, the conventional method described above has the following problems.

When calculation of a thermal conductivity is to be performed, the sample must be classified in order to calculate a heat capacity to be applied. The current must be determined and the obtained predetermined current must be flowed to the heater to heat it. With the conventional method, required voltage and current cannot be obtained immediately after the start of power supply because of the transition phenomenon or the like of the power supply. As a result, the reliability of the initial data cannot be improved. More specifically, since the thermal conductivity also depends on temperatures, when the heater is heated after power supply is started and before required current and voltage are obtained, the temperature of the test piece is increased, and the precision of the test result immediately after the start of power supply is degraded.

SUMMARY OF THE INVENTION

It is an object of the present invention to provide a method of measuring a water content by using a simple apparatus.

It is another object of the present invention to provide a method and apparatus for automatically controlling a water content in accordance with a measured water value.

It is still another object of the present invention to provide a method and apparatus for measuring a water content, wherein calculation of the water content is systematized by programming and water content management can be automatically performed.

It is still another object of the present invention to provide a method and apparatus for measuring a water content, wherein a water content in even a deep portion of soil can be easily measured.

It is still another object of the present invention to provide a method and apparatus for measuring a water content, wherein reliability of initial data and test precision can be improved.

It is still another object of the present invention to provide an apparatus for measuring a water content, wherein the size of the apparatus is decreased while the apparatus can be easily manufactured.

According to an aspect of the present invention, there is provided a method of measuring a water content comprising the steps of:

measuring a thermal conductivity of a measurement target; and calculating a water content of the measurement target from the thermal conductivity obtained in the above measurement step in accordance with prepared correlation data of the thermal conductivity and water content of the measurement target.

Sampling of the measurement target and actual water content measurement can be performed only once. Measurement of a water content in a deep portion can be performed. In addition, calculation of a thermal conductivity, and calculation of a water content from the thermal conductivity, can be systematized or automated using a program.

According to another aspect of the present invention, there is provided an apparatus for measuring a water content, comprising:

means for measuring a thermal conductivity of a measurement target; and means for calculating a water content of the measurement target from the thermal conductivity obtained by said measuring means in accordance with prepared correlation data of the thermal conductivity and water content of the measurement target.

According to the apparatus described above, the water content of a measurement target whose water content is to be managed is calculated from this thermal conductivity. Since the thermal conductivity can be easily measured using a thermal probe, the water content can be obtained quite easily. Water content management in accordance with the obtained water content is automatically performed using a control unit.

According to the apparatus having the above-described arrangement, at the start of measurement, a dummy resistor is powered by a switch, and a constant current source is operated to flow a current in the dummy resistor. Current is supplied to the heater by the switch after the output from the constant current source is stabilized. Therefore, when the switch is turned on, a current of a predetermined value is flowed to the constant current source from the beginning of the switching operation. As a result, the reliability of the initial data can be improved.

DETAILED DESCRIPTION OF THE PREFERRED EMBODIMENTS

A first embodiment of the present invention will be described with reference to FIGS. 1 to 4.

Figure 1:
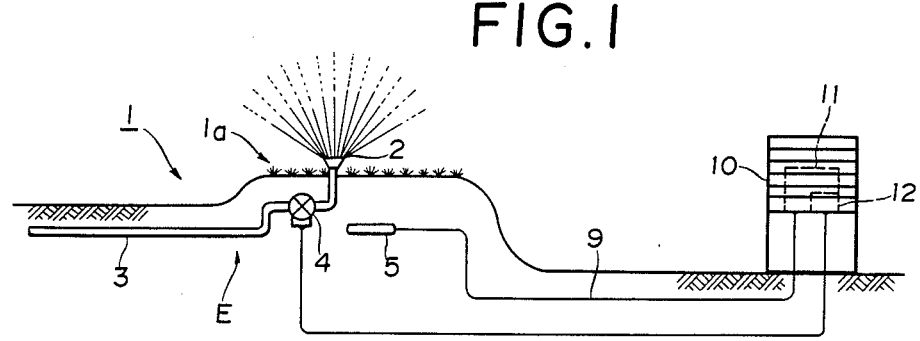
FIG. 1 is a profile of a golf course to which a method of measuring a water content according to a first embodiment of the present invention is applied.
Figure 2:
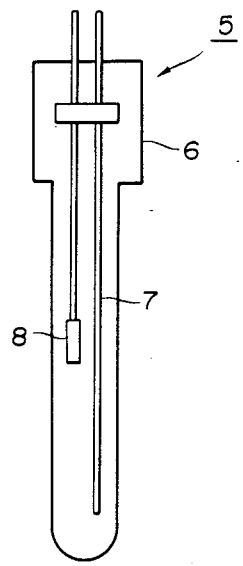
FIG. 2 is a sectional view of a thermal probe for measuring a thermal conductivity according to the present invention.

FIG. 1 shows a water content measuring method according to the first embodiment of the present invention which is applied to water content management of soil E (target to be managed) in a golf course. Referring to FIG. 1, reference numeral 1 denotes a golf course; and 1a, a putting green. The putting green 1a is provided with a sprinkler 2 for sprinkling water to its lawn. Water is supplied to the sprinkler 2 through a piping 3 buried in the soil E. The piping 3 is provided with an electromagnetic valve (management system) for starting and stopping water supply to the sprinkler 2. A thermal probe 5 is buried in the soil E under the putting green 1a. The thermal probe 5 has an arrangement as shown in FIG. 2. A pair of a heater 7 made of, e.g., Constantan and a temperature sensor 8 made of a copper-Constantan (CC) thermocouple or a platinum (Pt) resistor are arranged in a stainless protection tube 6 to constitute the thermal probe 5. Power is supplied to the heater 7 from a constant current source (not shown), and the heater 7 generates heat. A temperature detected by the temperature sensor 8 is read by a water content calculation unit 11 through a sensor cable 9. The water content calculation unit 11 comprises a microcomputer as a control unit 12 and is housed in an an instrument shelter 10 installed on the earth (see FIG. 1).

The control unit 12 sends a control signal S1 to the electromagnetic valve 4 through a control cable 13 in accordance with a water content calculated by the water content calculation unit 11 on the basis of the thermal conductivity of the soil E. This operation will be described in detail later.

The water content management system of FIG. 1 comprises the electromagnetic valve 4, the thermal probe 5, and the water content calculation unit 11 including the control unit 12.

The operation of the water content management system of FIG. 1 which has the above arrangement and uses a thermal conductivity detector will be described.

Figure 3:
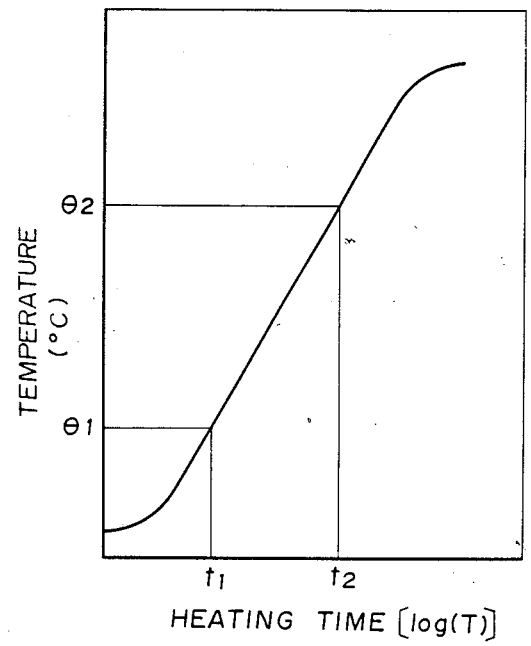
FIG. 3 is a graph showing a relationship between a heating time and a temperature of the thermal probe.

Power is supplied to the heater 7 of the thermal probe 5 for a predetermined period of time T, and a temperature in the soil E during this period of time is detected by the temperature sensor 8. A heating time for heating a certain material with a predetermined thermal energy and a resultant temperature of the material has a correlation as shown in FIG. 3. The thermal conductivity $\lambda$ can be obtained by the following formulae:

$$\lambda = 0.0438 \times H/(\theta 2 - \theta 1) \times \log\ (t2/t1)$$
(cal/cm · sec · °C.)
(CGS unit system)

$$\lambda = 15.8 \times H/(\theta 2 - \theta 1) \times \log\ (t2/t1)$$
(kcal/m · h · °C.)
(MKS unit system)

where H (watt/cm) is the predetermined thermal capacity of the temperature sensor 8, $\theta 1$ (° C) is a sensor temperature at time t1, and $\theta 2$ (° C) is a sensor temperature at time t2. Namely, when the above calculation is performed, the thermal conductivity of the soil E in which the temperature sensor 8 is buried can be obtained.

Figure 4:
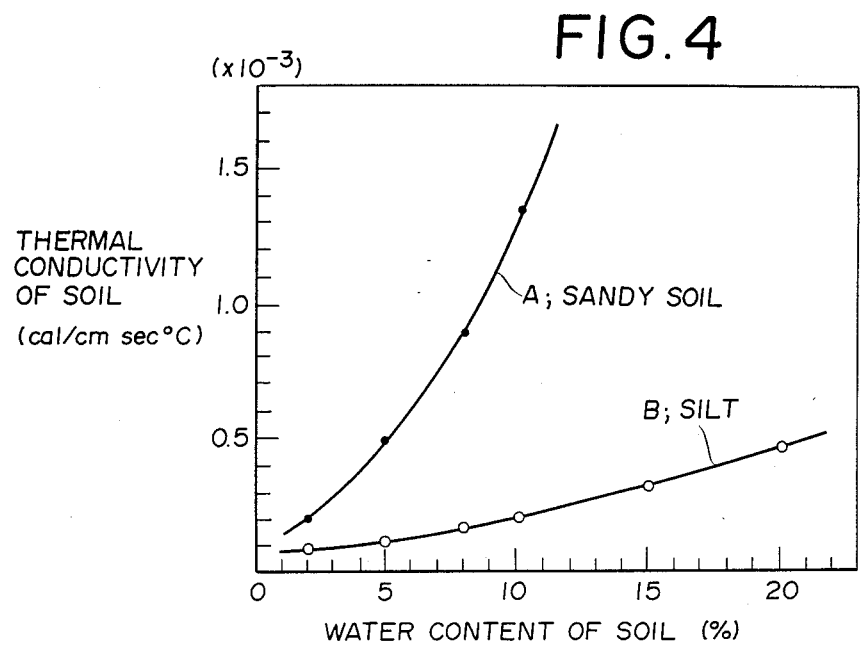
FIG. 4 is a graph showing a relationship between a thermal conductivity and a water content of soil.

It was found that the water content and thermal conductivity of soil are simply correlated with each other as shown in FIG. 4. FIG. 4 shows this correlation for a sandy soil (curve A) and a silt (curve B). Using FIG. 4, the water content of the sandy soil and silt can be obtained from their thermal conductivities. However, every soil has a specific correlation between its water content and thermal conductivity. Therefore, when a water content of a certain soil is to be obtained, its correlation with its thermal conductivity must be obtained by sampling. When the thermal conductivity $\lambda$ is calculated by the water content calculation unit 11, the water content can be obtained from it.

In this manner, the water content of the soil E of the putting green 1a is measured by the thermal probe 5. Information regarding the water content of the soil E is supplied to the control unit 12. The control unit 12 sends the control signal S1 to the electromagnetic valve 4 in accordance with the information.

When the measured water content is less than a required value, the electromagnetic valve 4 is energized and the sprinkler 2 sprinkles water. The water content of the soil E is intermittently measured by the above method even during water sprinkling. When the measured water content reaches an upper limit of an optimum water content range of the putting green 1a, the electromagnetic valve 4 is deenergized. When water is naturally evaporated and the water content reaches a lower limit of the optimum water content range, the electromagnetic valve 4 is energized and water is sprinkled.

Figure 6:
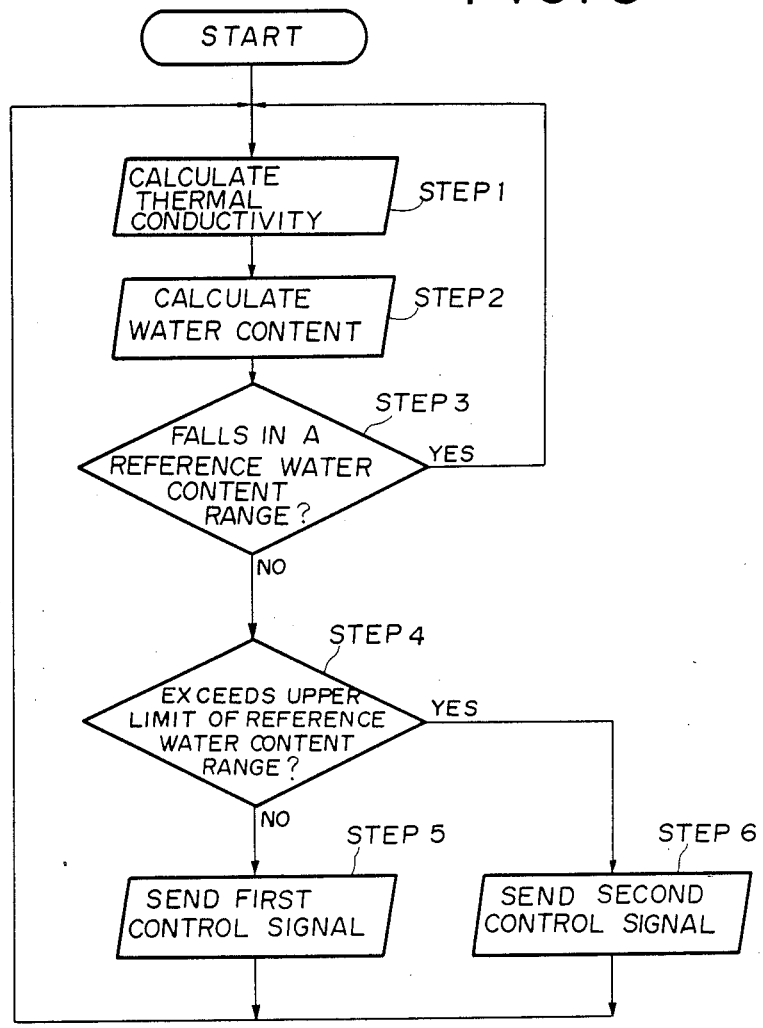
FIG. 6 is a flow chart showing an operation for controlling the water content according to the present invention.

The operation of controlling the electromagnetic valve 4 will be described in more detail with reference to FIG. 6.

A temperature signal from the temperature sensor 8 is input to the microcomputer as the control unit 12 of the water content calculation unit 11, and the thermal conductivity is calculated in accordance with the programmed calculation formulae in step 1. In step 2, the water content is calculated from the calculated thermal conductivity in accordance with data indicating the correlation between the thermal conductivity and water content. This data is obtained in advance by sampling the soil as a measurement target and input in the microcomputer of the thermal content calculation unit 11. It is checked in step 3 whether the obtained water content falls within a predetermined reference water content range of the putting green 1a. If YES in step 3, the flow advances to the step 1. If NO in step 3, it is checked in step 4 whether the obtained water content exceeds the upper limit of the reference water content range. If NO in step 4, a first control signal is sent to the electromagnetic valve 4 in step 5. The electromagnetic valve 4 is thus opened or kept open and water is sprinkled by the sprinkler 2, and the flow returns to step 1. If YES in step 4, a second control signal is sent to the electromagnetic valve 4 in step 6. The electromagnetic valve 4 is thus closed and water sprinkling is stopped or kept stopped. The flow then returns to step 1.

In this manner, according to the water content management system of the first embodiment of the present invention, a water content of the soil E is calculated by measuring the thermal conductivity of the soil E, and the electromagnetic valve 14 is controlled in accordance with the obtained water content, thereby adjusting the water content of the soil E. Once the relationship between the thermal conductivity and water content of a management target is obtained, the current water content of the soil E, i.e., the management target can be immediately obtained by measuring the thermal conductivity. Therefore, water content measurement can be performed easily in a real time manner. Since the water content is automatically adjusted by the control unit (i.e., microcomputer) 12 in accordance with the obtained water content value, reliable unmanned water content management can be realized.

The relationship between the thermal conductivity of the management target and the water content thereof obtained by the water content calculation unit 11 can be expressed by a relation (formula). Therefore, when the parameters of the formula are appropriately set, the control unit 12 can be directly driven in accordance with the thermal conductivity.

As described above, once the relationship between a water content and thermal conductivity of soil as the target of water content measurement is determined, the water content of the soil E can be easily obtained by measuring the thermal conductivity. Therefore, sampling of the target soil and cumbersome water content measurement can be performed only once. Calculation of the thermal conductivity and that of the water content from the thermal conductivity can be systematized as described above in accordance with a program. As a result, water content management can be automatically performed. If correlation data as shown in FIG. 4 for many types of soil are prepared in advance, the water content of the soil can be approximated from the data without a need for actual sampling if only the nature of a soil as a measurement target is known. In this case, water content management can be more facilitated.

Figure 5:
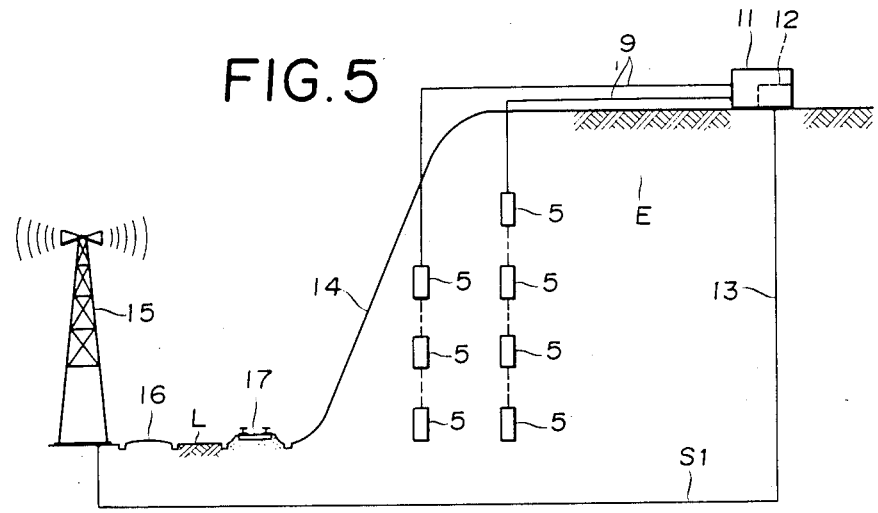
FIG. 5 is a sectional view of a land feature having a slope to which a method of measuring a water content according to a second embodiment of the present invention is applied.

FIG. 5 shows a water content measuring method according to a second embodiment of the present invention which is applied to water content management for preventing landslide of the slope caused by rainfall. The same reference numerals in FIGS. 1 to 4 denote the same parts in FIG. 5.

Referring to FIG. 5, reference E denotes a soil having a slope 14. An alarm system (alarm equipment; management unit) 15 is provided at a flat spot on the downstream side, i.e., on the low ground L side of the slope 14. When landslide of the slope 14 may happen, the alarm system 15 informs the habitants or passers-by living in or passing the low ground L of it. Reference numeral 16 denotes a road; and 17, a railroad. Several rows (two rows in FIG. 5) of a plurality of thermal probes 5 having the same arrangement as that of the first embodiment are buried in the vertical direction in the soil E with the slope 14 as its side surface. These thermal probes 5 are connected to the water content calculation unit 11 installed on the earth through the sensor cables 9. The water content calculation unit 11 measures the temperature change over time of the temperature sensor 8 provided to each thermal probe 5 and calculates the thermal conductivity of the soil E surrounding the corresponding thermal probe 5 from the relationship between the measuring time and the measured temperature. A control unit (microcomputer) 12 is provided in the water content calculation unit 11. The control unit 12 sends a control signal S1 to the alarm system 15 through a control cable 13 in accordance with the water content calculated by the water content calculation unit 11 on the basis of the thermal conductivity.

The operation of the water content management system of this embodiment will be described.

The water content of the soil E is measured in the same manner as in the first embodiment. More specifically, a relationship between the water content and thermal conductivity of the soil E as the measurement target (management target) is obtained in advance using samples. If the soil resembles to soil whose water content-thermal conductivity relationship is already obtained and expressed as a graph as FIG. 4, the data of the soil E in question can be approximated from that.

The heater 7 of each thermal probe 5 is heated by a constant current for a predetermined period of time T, and the thermal conductivity $\lambda$ of the soil E is calculated using the relationship between the time T and an increase in temperature. As a result, the water content of the soil E is calculated. An analysis for a stable slope is performed using the obtained water content, and obtained information is supplied to the control unit 12. If the safeness obtained by the analysis reaches a landslide caution level, the control signal S1 is supplied from the control unit 12 and an alarm is generated by the alarm system 15.

According to a modification, the control unit 12 does not simply send one type of signal when the water content reaches the caution level. Rather, the control unit 12 may send different stepwise signals to the alarm unit 15 as the water content increases. The alarm system 15 may generate different alarms in accordance with the different situations. As a result, more detailed information about the state of the slope 14 is given to habitants or passers-by at the low ground L. The alarm equipment can be a signal light, an emergency gate, or a sign alarm board other than the alarm system 15. With the alarm system having the above-described arrangement, the traffic of the road 16 or the railroad 17 located in the landslide caution area of the sloped land can be automatically regulated.

According to the water content management system of the present invention, the water content of a soil or the like is calculated by measuring the thermal conductivity of the soil. Therefore, only the thermal conductivity must be measured using the thermal probe 5, as described above. The water content in a deep portion of the soil E can be easily measured as in this embodiment.

When the water content of the soil E is periodically measured, even if the water content of the soil E is abruptly increased by rain and the soil E is in a danger of landslide, it can be quickly detected and transmitted.

In the above embodiments, soil is the target of water content measurement. In this case, the management system can be applied to a farm or an exercise yard in addition to a golf course. The target of the water content measurement system of the present invention is not limited to soil but can be applied to a livestock feed or raw material.

An apparatus for measuring a water content according to the present invention will now be described with reference to FIGS. 7 to 12.

Figure 7:
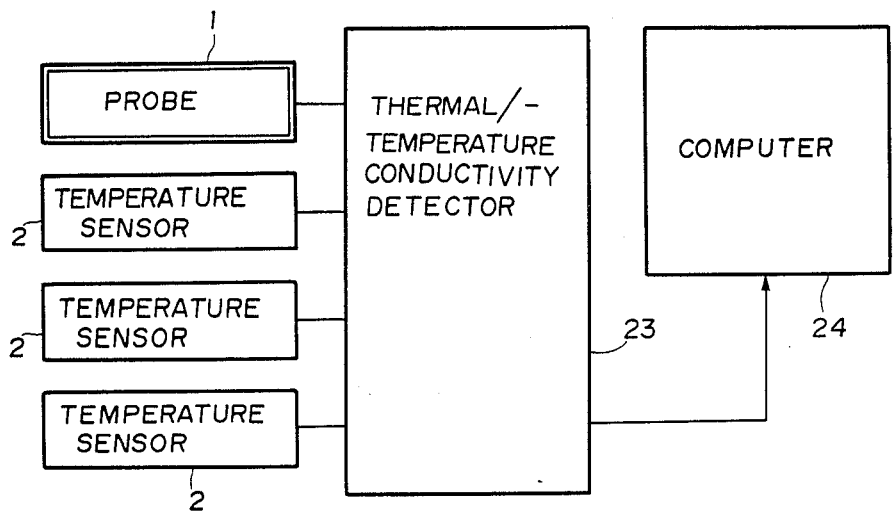
FIG. 7 is a block diagram showing a system configuration of an apparatus for measuring a water content according to the present invention.
Figure 8:
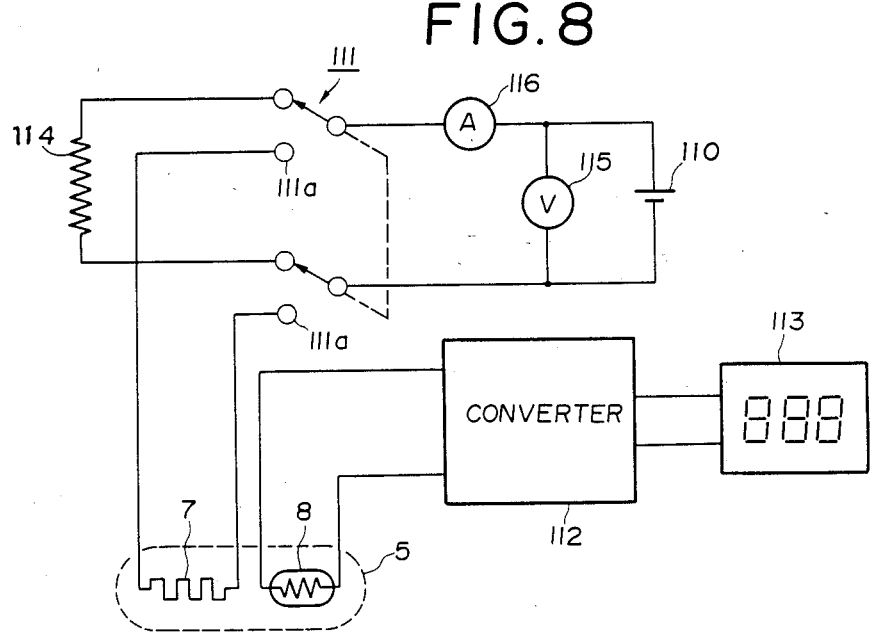
FIG. 8 is a circuit diagram of the same.

FIG. 7 shows the system configuration of the water content calculation unit 11; and FIG. 8 is its circuit diagram. The same reference numerals as in FIGS. 1 to 6 denote the same parts, and a detailed description thereof is omitted.

Referring to FIG. 7, a thermal probe 5 is inserted into a sample (test piece) and causes thermal conduction in the test piece. Temperature sensors 22 are used for measuring temperature conductivities. A detector 23 detects a change in temperature and a time measured by the thermal probe 5 and the temperature sensors 22 and calculates thermal and temperature conductivities. A personal computer 24 is used for decoding data recorded in an IC card through the detector 23, or for storing the data in a memory medium such as a floppy disk.

The enumerated major components will be described in detail with reference to FIGS. 8 to 10. A pair of heater 7 made of Constantan and a temperature sensor 8 made of a copper-Constantan (CC) thermocouple or a platinum (Pt) resistor are provided in a closed stainless protection tube 6 to constitute the thermal probe 5, as shown in FIG. 10. The thermal probe 5 is inserted into a test sample together with the protection tube 6. A temperature sensor 8 made of a platinum resistor is more preferable than one made of a copper-Constantan thermocouple when interchangeability, reproducibility, changes over time, and precision are considered.

The input terminal of the heater 7 stored in the thermal probe 5 is connected to a connection terminal 110a of a switch 111 provided to the output terminal of a constant current source 110, as shown in FIG. 8. An output from the constant current source 110 is input to the heater 7 through the switch 111. The input terminal of the temperature sensor 8 is connected to an LCD thermometer 113 through a converter 112.

A dummy resistor 114 having the same resistance as the heater 7 is connected to the output terminal of the constant current source 110 through the switch 111. A current to the heater 7 is switched by the switch 111 and supplied to the dummy resistor 114 in advance. As a result, a stable output can be obtained from the constant current source 110.

Referring to FIG. 8, reference numeral 115 denotes a voltmeter; and 116, an ammeter. The voltmeter 115 and the ammeter 116 respectively detect the voltage and current signals from the constant current source 110.

Figure 9:
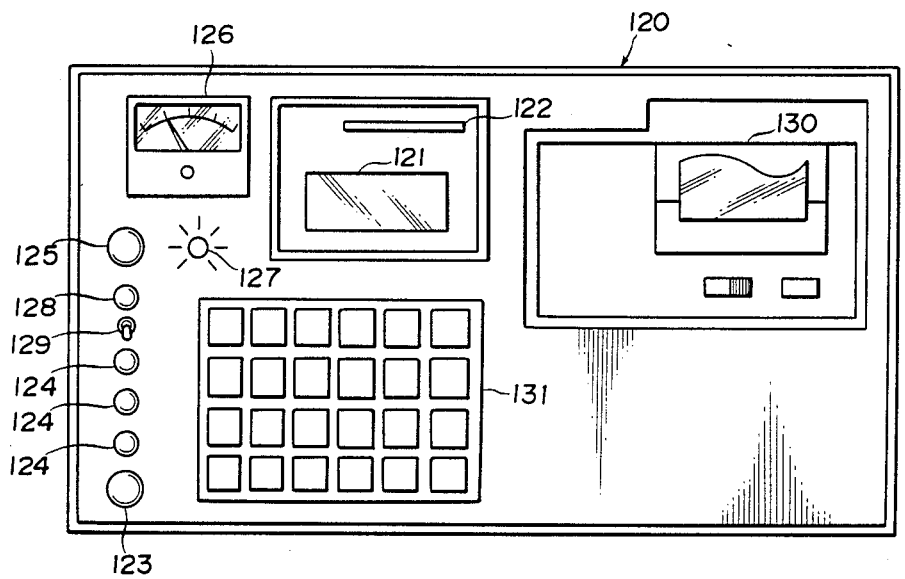
FIG. 9 is a plan view showing a detector.
Figure 10:
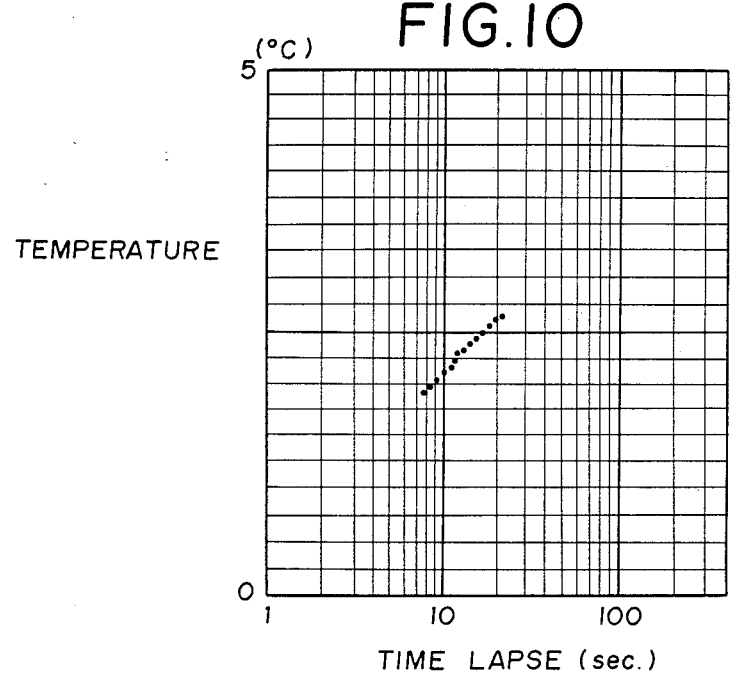
FIG. 10 is a graph showing an actual change over time in temperature of the thermal probe.

FIG. 9 schematically shows the detector 23 for detecting a temperature change measured by the thermal probe 5 and the time. An LCD (Liquid Crystal Display) 121, a memory buffer 122 comprising an IC card, a sensor terminal 123 connected to the thermal probe 5, sensor terminals 124 connected to the temperature sensors 22, a surface heater terminal (to be described later) 125 for measuring a temperature conductivity, a heater output meter 126, a surface heater output volume 127, a power source terminal 128, a power source switch 129, a printer 130, and a keyboard 131 are arranged in the front panel of the box-like detector main body 120.

The sequence of measuring the thermal conductivity using the apparatus having the above-described arrangement will be described.

(i) Insertion of Thermal Probe 5

A heat capacity to be applied is calculated in advance by classifying the sample, and the current to be applied is determined. A thermal probe 5 is inserted in the sample.

(ii) Power Supply to Dummy Resistor

The switch 111 is switched to the dummy resistor 114 side. The power source is operated to supply an output from the constant current source 110 to the dummy resistor 114. Since the resistance of the dummy resistor 114 is the same as that of the heater 7 in the thermal probe 5, when the current is flowed in the dummy resistor 114, the current can be adjusted to a predetermined value.

(iii) Power Supply to Heater

When the current from the constant current source 110 is stabilized by the above operation, the switch 111 is switched to flow a current from the constant current source 110 to the heater 7 in the thermal probe 5. In this case, the power supply from the constant current source 110 is preset at predetermined current and voltage by supplying power to the dummy resistor 114. Therefore, the power of the predetermined current and voltage is supplied to the heater 7 in the thermal probe 5 by switching the switch 111.

A predetermined current is supplied to the heater 7 simultaneously when the switch 111 is switched. Unstable states such as a transition phenomenon occurring due to energization of the constant current source 110 are thus allowed. A thermal conductivity can be obtained from a slight temperature increase of the heater 7. As a result, the reliability of the initial data to be measured in accordance with the following sequence can be improved.

(iv) Measurement of Change in Temperature over Time

When power is supplied to the heater 7, thermal conduction occurs in the test piece into which the thermal probe 5 is inserted. The temperature change in the thermal probe 5 over time is measured at predetermined intervals by the temperature sensor 8.

(v) Calculation of Thermal Conductivity

The relationship between the time for heating the test piece with a predetermined thermal energy by the heater 7 and the resultant temperature exhibits a certain correlation as shown in FIG. 3 when the time base is expressed as a logarithm (log). The thermal conductivity can be calculated from the gradient of the linear portion of the graph in the manner described above with reference to the explanation of the operation of the water content management system.

A temperature conductivity can be calculated from the obtained thermal conductivity in accordance with the following equation by substituting the specific heat c and density $\rho$ of the test piece with actual values:

$$\alpha = \lambda/(\rho \times c) \ (m^2/hour)$$

In this embodiment, data obtained by the measurement is recorded in an IC card. Therefore, even if the measurement is performed in a dusty place, data can be correctly collected. When the data recorded in the IC card is decoded using the personal computer 24, the data can be recorded and stored in a memory medium such as a floppy disk. Although the detector 23 comprises a unit having not only a measurement function but also an analysis function, it can be made as a system having a simple configuration. Therefore, the unit itself is very compact and easy to operate.

In this arrangement, since the heater for causing thermal conduction in the test piece and the temperature sensor 8 for measuring a temperature change of the heater 7 are sealed in the protection tube 6, the heater 7, the temperature sensor 8, and the like can be easily arranged in the test piece and are well waterproofed. When the thermal probe 5 is directly buried in the earth, this arrangement can be applied to water content management of a farm or the like.

FIG. 10 shows a change over time in temperature of the thermal probe 5 when the thermal conductivity is measured in accordance with the above sequence. The temperature is measured every four seconds. As is apparent from FIG. 10, a thermal conductivity can be obtained from a slight temperature increase of 1 to 3° C.

In this case, the operation conditions of the unit were set as follows:

1. Dummy resistor 50Ω (temperature increase 5 to 6° C)
2. Measuring time: 10 minutes
3. Number of measuring point: 600 points/channel
4. Heater current: about 100 mA (determined according to the sample)
5. Heater voltage: 0 to 10 V
6. Measurement data: current, voltage, temperature, and time
7. Temperature sensor: platinum resistor for temperature measurement Apart from the above sequence for obtaining a temperature conductivity by calculation using an obtained thermal conductivity, a method of directly obtaining a temperature conductivity will be described with reference to FIG. 11.

Figure 11:
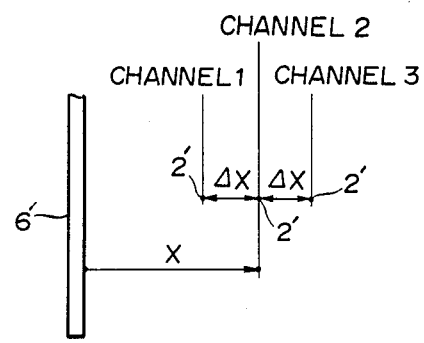
FIGS. 11 and 12 are views for explaining a method for directly measuring a temperature conductivity.

When a temperature conductivity is to be obtained directly, a surface heater 6' is arranged at a central portion of the test piece, and three temperature sensors 2' are arranged at locations spaced apart from the heater 6' by arbitrary distances and to be equidistant from each other, as shown in FIG. 11. The temperature sensors 2' can be platinum resistors for temperature measurement, and set as channel 1, channel 2, and channel 3 from the surface heater 6' side.

In the case of FIG. 11, the distance between the surface channel 6' and the central platinum resistor is set to be x (m), and the distance between the central platinum resistor and each of the adjacent resistor is set to be $\Delta x$.

The surface heater 6' arranged in the test piece is heated. The temperature change over time in the test piece is measured at three points equidistant from each other by $\Delta x$ (m) three times each at every $\Delta t$ (hour). The temperature conductivity $\alpha$ (m$^2$/hour) is obtained in accordance with the following equation:

$$\alpha = \Delta x^2/\Delta t \ \frac{\begin{pmatrix} 5 & 38 & 5 \\ 0 & 0 & 0 \\ -5 & -38 & -5 \end{pmatrix} \begin{matrix} \ldots t2 \\ \ldots t1 \\ \ldots t0 \end{matrix}}{\begin{pmatrix} 1 & -2 & 1 \\ 4 & -8 & 4 \\ 1 & -2 & 1 \end{pmatrix} \begin{matrix} \ldots t2 \\ \ldots t1 \\ \ldots t0 \end{matrix}}$$

$$\begin{matrix} \cdot & \cdot & \cdot \\ \cdot & \cdot & \cdot \\ \cdot & \cdot & \cdot \\ r0 & r1 & r2 \end{matrix}$$

Since the above determinant represents a temperature coefficient, it can be expressed as follows from a function $\phi$ of the distance x between the surface heater 6' and the central resistor and the measuring time t:

$$\begin{bmatrix} 5 & 38 & 5 \\ 0 & 0 & 0 \\ -5 & -38 & -5 \end{bmatrix} = \begin{matrix} 5 \times \phi(x0,t2) + 38 \times \phi(x1,t2) + \\ 5 \times \phi(x2,t2) - 5 \times \phi(x0,t0) - \\ 38 \times \phi(x1,t0) - 5 \times \phi(x2,t0) \end{matrix}$$

Figure 12:
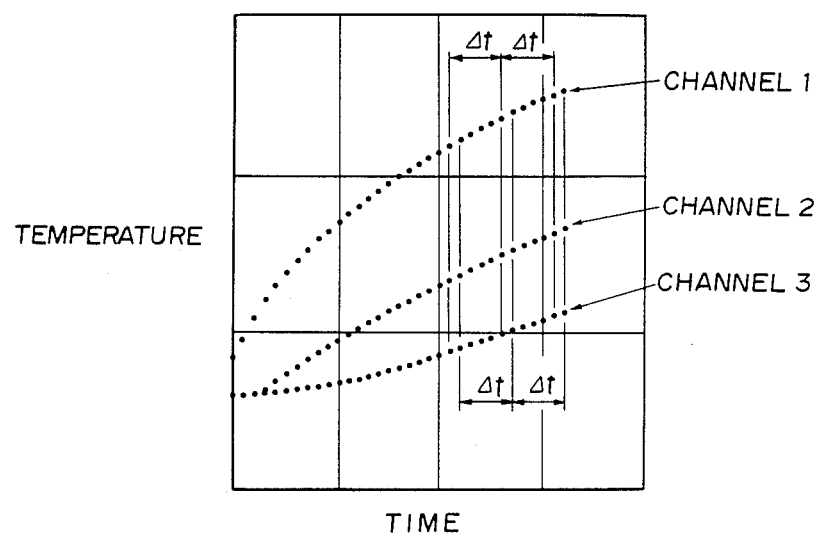

FIG. 12 shows temperature changes over time of the respective channels obtained by the temperature sensors 22. When the relationship as shown in FIG. 12 is obtained, temperature conductivities are sequentially calculated by the detector 23 in accordance with the above equation at an arbitrary time interval $\Delta t$. The obtained temperature conductivities are averaged in units of channels or time intervals, thereby obtaining a temperature conductivity of the sample.

Using the following equation:

$$\alpha = \mu/(\rho \times c) \ (m^2/hour)$$

which was described above, when is obtained specific heat c can be easily obtained.

With the above-described arrangement, the present invention has the following advantages:

1. A current is flowed to the dummy resistor from the constant current source at the start of measurement. The current can be flowed to the heater by the switch after the output from the constant current source is adjusted to a predetermined state. Therefore, an unstable state such as a transition phenomenon caused by turning on the switch can be allowed with a simple arrangement, and a thermal conductivity can be obtained from a slight temperature increase of the heater. As a result, the reliability of the initial data and the testing precision are improved.

2. Since the entire apparatus can be made as a system with a simple structure, the size of the apparatus can be decreased while the apparatus can be easily manufactured.

As has been previously described, according to the present invention, when a water content of a soil or the like is to be measured, a correlation between the water content and the thermal conductivity of the measurement target, such as soil, is determined in advance using a sample selected from the measurement target. The water content of the measurement target is calculated by measuring its thermal conductivity. Therefore, sampling of the measurement target and cumbersome water content measurement can be performed only once. Since calculation of the thermal conductivity, and calculation of the water content from the thermal conductivity, can be automated using a program, water content of the measurement target can be automatically managed. In actual water content measurement, since only the thermal conductivity must be measured, a water content in a deep portion of soil or the like can be performed quite easily.

Specific embodiments of the present invention were described. However, it must be understood that the present invention is not limited to them and various changes and modifications can be made within a spirit and scope of the invention.

What is claimed is:

1. A method of measuring a water content of a soil, comprising the steps of:
   (a) arranging a temperature detection unit in the soil, the temperature detection unit including a heater, a heat sensor and heat conductive accommodating means for accommodating in a spaced manner both the heater and the heat sensor therein;
   (b) energizing the heater;
   (c) the heat sensor receiving heat from the heater to provide temperature signals;
   (d) obtaining a thermal conductivity of the soil on the basis of the difference between temperature signals provided from the heat sensor at a time interval;
   (e) calculating the water content from the thermal conductivity obtained in the step (d) in accordance with previously obtained data representing a correlation between thermal conductivity and water content of the soil.

2. A method as recited in claim 1, further comprising the steps of:
   (g) comparing the water content calculated by the step (e) with a predetermined reference water content range, checking whether the water content falls outside the range and, if the water content exceeds the upper limit value of the range, outputting a control signal; and
   (h) managing a state caused by an excessive water content on the basis of the control signal output in the step (g).

3. A method as recited in claim 2 wherein:
   the measurement target is soil;
   the step (g) of outputting the control signal includes the step of outputting a first control signal when the measured water content is less than a lower limit of the reference water content range, and the step of outputting a second control signal when the measured water content exceeds the upper limit of the reference water content range; and
   the managing step (h) includes the step of opening an electromagnetic valve, used for controlling an amount of water supplied to the soil by a water supply unit, by the first control signal, thereby supplying water, and the step of stopping said electromagnetic valve by a second signal, thereby stopping water supply.

4. A method as recited in claim 2, wherein the step (g) of outputting the control signal includes the step of operating an alarm system by the control signal, thereby generating an alarm.

5. A method as recited in claim 2, further comprising the steps of: electrically connecting a dummy resistor, equal in electrical resistance to the heater, to an electric power source before the heater is energized and until current, supplied to the dummy resistor, becomes stabilized; and then switching electric connection of the power source from the dummy resistor to the heater when the current becomes stabilized, whereby a predetermined current flows to the heater.

6. A measuring apparatus for measuring a water content of a soil, comprising:
   (a) a heater adapted for electrical connection to a constant current supply means;
   (b) a heat sensor for outputting temperature signals;
   (c) heat conductive accommodating means, adapted to be arranged within the soil, for accommodating in a spaced manner both the heater and the heat sensor therein so that the heat sensor receives heat from the heater;
   (d) thermal conductivity measuring means for measuring a thermal conductivity of the soil on the basis of the difference between temperature signals supplied from the temperature sensor at a time interval;
   (e) water content calculating means for calculating the water content of the soil on the basis of the thermal conductivity, measured by the thermal conductivity measuring means, and in accordance with previously obtained data representing the correlation between thermal conductivity and water content of the soil.

7. An apparatus as recited in claim 6, wherein said measuring means comprises:
   a dummy resistor having the same electric resistance with said heater; and
   a switch for electrically, selectively connecting said dummy resistor to said constant current supplying means to be parallel therewith.

8. An apparatus as recited in claim 6, wherein
   said calculating means further comprises control signal output means for comparing the calculated water content with a predetermined reference water content range to check if the water content falls outside the reference water content range, and for outputting an electrical control signal when the water content exceeds an upper limit of the reference water content range, and
   said apparatus further comprises state managing means for managing a state caused by an excessive water content on the basis of the control signal.

9. An apparatus as recited in claim 8, wherein
   the measurement target is soil, and said state managing means includes electromagnetic valve means for controlling an amount of water to be supplied to the soil by a water supply unit, and said electromagnetic valve means is controlled by the control signal, thereby controlling the water content of the soil.

10. An apparatus as recited in claim 8, wherein the measurement target is soil, and
said state managing means includes alarming means for receiving the control signal and generating an alarm representing that the water content of the soil is excessive.

* * * * *